Figures 1, 2:
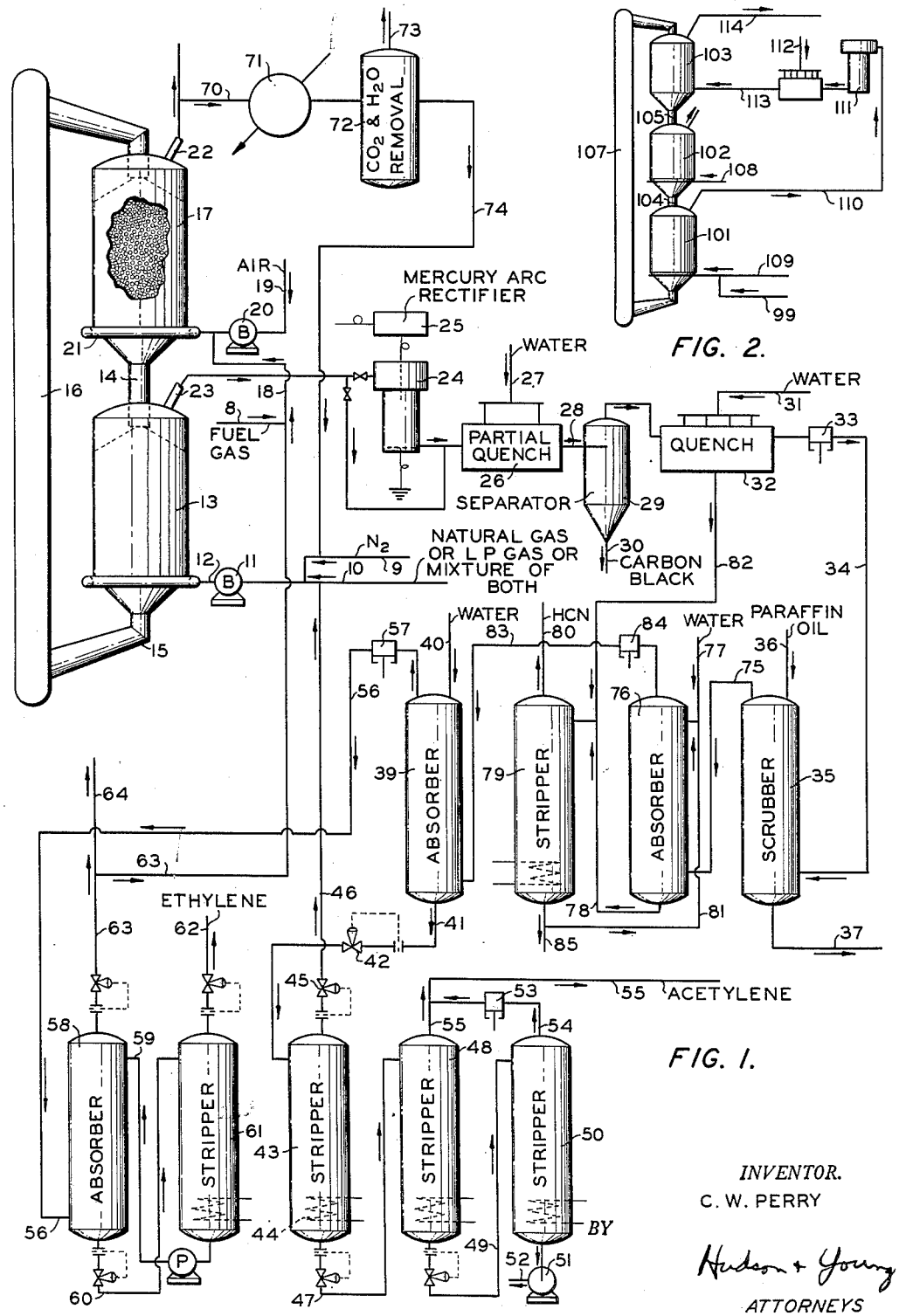

June 29, 1954  C. W. PERRY  2,682,447

PROCESS FOR PRODUCTION OF HYDROGEN CYANIDE AND ACETYLENE

Filed Jan. 12, 1951

INVENTOR.
C. W. PERRY

BY

Hudson + Young
ATTORNEYS

Patented June 29, 1954

2,682,447

UNITED STATES PATENT OFFICE 2,682,447

PROCESS FOR PRODUCTION OF HYDROGEN CYANIDE AND ACETYLENE

Charles W. Perry, Bartlesville, Okla., assignor to Phillips Petroleum Company, a corporation of Delaware Application January 12, 1951, Serial No. 205,737

6 Claims. (Cl. 23—151)

This invention relates to the simultaneous production of hydrogen cyanide (HCN) and acetylene ($C_2H_2$) by the high temperature pyrolysis of a mixture of nitrogen and hydrocarbon material in the electric arc. In certain aspects ethylene is also produced and recovered. In preferred embodiments the invention effects desirable removal of certain carbon-forming constituents of feed gases prior to contact with the arc while concomitantly preheating the gases, resulting in increased yields of products for a given current consumption in the arc.

It has long been known that passage of hydrocarbon gases, either normally gaseous or normally liquid in the vaporized state, in admixture with nitrogen, through an electric arc, at, say, 3000° F., followed by rapid quenching, gives valuable yields of acetylene and hydrogen cyanide, and usually also practical yields of ethylene, together with varying quantities of other useful products such as naphthalene, benzene, hydrogen, and carbon black. The relative amounts of the various products depend to a great extent on the particular hydrocarbon feed stock used, the ratio of nitrogen to hydrocarbon, the conditions of operating the arc, the residence time at high temperatures, and the rapidity of bringing the reactants to the arc temperature and of quenching the products down to a sufficiently low temperature to stop undesired polymerization of HCN and unsaturated hydrocarbons and other side reactions. Methane is probably the cheapest and most useful hydrocarbon reactant, although liquefied petroleum gases such as the $C_3$'s and $C_4$'s, and naphthas, and in fact almost any hydrocarbon material, can be used. Natural gas, of course is the most readily available supply of methane, and accordingly is the preferred stock. However, the hydrocarbons in natural gas heavier than methane, largely ethane but including at least propane and often ranging up into the gasoline range in small amounts, are much more readily cracked than methane and therefore undergo decomposition to form carbon during preheating or when first entering the arc if preheating is not practiced. While carbon is an almost inevitable product of the arc process for producing acetylene and HCN, the quality of the carbon produced is sometimes not sufficiently high to make its recovery for sale very desirable. Particularly if carbon is formed before the arc is reached it tends to plug the arc unit with consequent increased frequency of shutdowns.

Nitrogen for this process can be obtained from any suitable source. The recent improvements in air liquefaction and rectification make high purity nitrogen available at reasonable cost. Nitrogen can also be obtained from flue gases by treating same in known manner for removal of carbon oxides and water, as well as various impurities characteristic of the different industrial flue gases. A convenient source of nitrogen is made available by burning natural gas, heavy residual oils, or other cheap fuels in air, scrubbing the resulting flue gas with monoethanolamine to remove $CO_2$ and any acidic gases such as $SO_2$, then drying if desired though such drying is not necessary in my process. Another suitable and preferred nitrogen source is the flue gas obtained from the heating step of the process itself, as will be described hereinbelow in more detail. Purge gases from ammonia synthesis, which are rich in $N_2$ and $H_2$, and also contain 10 to 20 per cent methane if the synthesis gas has been made by reforming natural gas, can be used to advantage.

It is an object of this invention to provide improvements in the production of acetylene and hydrogen cyanide by the arc process.

Another object is to remove carbon-formers in the hydrocarbon feed stock to such an arc process in such manner that excessive carbon formation in the arc, or excessive presence of carbon in the gas fed to the arc, is avoided.

A further object is to improve the preheating of the hydrocarbon and nitrogen feedstock to the arc process.

Yet another object is to increase the yield of acetylene for a given consumption of electricity.

A still further object is to increase the yield of HCN for a given consumption of electricity.

A further object is to remove carbon from effluents of the arc in an improved manner while simultaneously quenching the effluents to avoid side reactions.

Another object is to provide an improved source of nitrogen for reaction with hydrocarbon in the electric arc, from another step in the process.

Further objects and advantages of the invention will be apparent to those skilled in the art, from the accompanying disclosure and discussion.

The invention may perhaps best be understood by reference to the following description of the accompanying drawing which is a schematic flow diagram of an arrangement of equipment elements and flow of materials therethrough suitable for practicing my invention in preferred embodiments. Figure 1 includes the treatment of effluents to recover constituents therefrom. Figure 2 does not include these items but is limited in its showing to the arc and the treatments of feedstock and products immediately prior to and after the arc, it being understood that the separatory procedures of Figure 1 or others, are used but are not shown on the drawing for the sake of simplicity. The various pumps, valves, and other necessary auxiliary equipment will readily be supplied by those skilled in the art.

Referring to Figure 1, the feed hydrocarbon, preferably natural gas, from line 10, and nitrogen from line 9, are passed by blower 11 and line 12 into a pebble heater unit 13 at a low point thereof. In unit 13 there is maintained a continuously downflowing mass or bed of contiguous pebbles which enter hot at the top through pebble throat 14 and leave relatively cool at the bottom through pebble outlet 15. These pebbles are formed of a suitable refractory material, usually comprising a fused alumina, and are conveniently about ⅜ inch in diameter, though they can be considerably smaller or larger. The pebbles, which by giving up heat have served to preheat the hydrocarbon and nitrogen feed stocks, are elevated by a bucket elevator or gas lift 16 to the top of pebble heating chamber 17. Fuel gas from line 8 and/or 18 and air from line 19 and blower 20 enter and burn in bustle ring 21, and the resulting hot combustion gases pass upwardly through pebble heating chamber 17 and out the stack 22. The pebbles flow down in a compact mass through unit 17 and become very hot, leaving the bottom of unit 17 through pebble throat 14 at a temperature of say 2200 to 2500° F. Approximately equal pressures (suitably 25 p. s. i. a.) are maintained in units 13 and 17 by known means to minimize flow of gases through throat 14, which also has a steam seal.

Preferably, a portion of the stack gas is withdrawn through line 70, cooled in heat exchanger 71, and passed through suitable treatment zone or zones 72 for removal of $CO_2$ and water which are indicated diagrammatically as being separated through line 73. Usually the most effective treatment in zone 72 is to scrub the cooled flue gas with aqueous monoethanolamine solution in known manner, the absorbed $CO_2$ then being liberated from the solution by moderate heating. The treated gas relatively free from $CO_2$, is very high in nitrogen content, and is passed via line 74 to line 9 as source of part or all of the nitrogen reactant in the process.

In the lower chamber 13 the hot pebbles rapidly bring the up-flowing hydrocarbon-nitrogen mixture to a temperature which preferably reaches 2000° F. by the time the gases exit from chamber 13 through line 23. This effects a preliminary cracking of a portion of the feed and in particular the $C_2$ and higher hydrocarbon content thereof. These $C_2$ and higher hydrocarbons can be called the carbon formers, since a high proportion of their carbon content is converted to elemental carbon if they reach the arc. In heater 13, preferential cracking of the $C_2+$ results in a higher ultimate conversion of same to the more desired $C_2$ unsaturates, i. e. acetylene and ethylene, than would occur in the arc, results in less carbon formation on the arc, and concomitantly the entire hydrocarbon and nitrogen feed is brought rapidly to a sufficiently high temperature that the electrical energy load on the arc is kept to a minimum. Appreciable amounts of carbon are formed in unit 13, and the bulk of this is carried downward in the pebble bed and is ultimately burned in the pebble heating chamber 17 whereby the energy content of this carbon is utilized as fuel. Hydrogen concomitantly produced has a very beneficial action in the arc and increases the yields of acetylene and HCN.

The preheated and partially cracked hydrocarbon gas admixed with nitrogen, withdrawn from the pebble heater through line 23 at 2000° F., is passed into arc furnace 24 wherein the gas passes through an electric arc and is therein subjected to a temperature of at least 2800° F. and preferably about 3000° F. for a very short period of time. Acetylene and hydrogen cyanide are concomitantly produced in the arc. Furnace 24 is of any suitable construction known to the art, and is supplied by a current source indicated diagrammatically by mercury arc rectifier 25. The effluent of arc furnace 24 is immediately quenched, in unit 26 by a water fog introduced from line 27, to a temperature at least as low as 1000° F. and preferably 700° F. The partially quenched stream passes through conduit 28 to a cyclone separator 29 from which carbon black is withdrawn through line 30. Gases from separator 29 are further quenched by water from line 31 in unit 32 to 300° F., compressed by compressor 33, and then passed through line 34 into the bottom of an absorber 35, operated at 20 to 45 p. s. i. a.

Unit 35 is fed at the top with a paraffinic absorption oil such as the well-known mineral seal oil from line 36, which flows downwardly and absorbs the liquid (and solid) hydrocarbon content of the product gases. These hydrocarbons are essentially all aromatics, and include benzene and naphthalene as valuable recoverable components. Small quantities of organic nitrogen compounds are also often recovered here. The rich oil is withdrawn from the bottom of absorber 35 through line 37 and passed to stripping and fractionating means (not shown). Scrubbed gas flows from the top of unit 35 through line 75 into the bottom of absorber 76, operated at 15 to 20 p. s. i. a., wherein HCN is absorbed by water introduced at the top through line 77. The resulting aqueous hydrocyanic acid flows through line 78 to HCN stripper 79 from which HCN is recovered as overhead product through line 80. The aqueous bottoms from stripper 79 is returned via line 81 to line 77 for reuse in absorber 76, a portion being discarded through line 85 to avoid accumulation of materials other than HCN. If the gaseous conversion products have been quenched to a sufficiently low temperature in unit 32 to result in a liquid aqueous phase therein, such phase is withdrawn from quencher 32 and passed through line 82 to stripper 79 for recovery of HCN therefrom. Any liquid organic phase separated in quencher 32 is passed (by means not shown) to the aromatics absorber 35.

Gas freed from HCN passes from the top of absorber 76 through line 83 and compressor 84 into the bottom of absorber 39, wherein acetylene is dissolved in water as a solvent, which is introduced at the top from line 40. Absorber 39 is operated at a pressure which preferably is in the range of 250 to 400 pounds per square inch absolute. Acetylene-rich water is passed through line 41 at a constant rate maintained by valve 42 into a series of acetylene strippers, the first of which is designated by numeral 43. This first stripper, which is provided with a conventional heater 44 in the bottom, operates at 35 p. s. i. a.

as maintained by back-pressure valve 45 in gas exit line 46. The latter leads back to juncture with hydrocarbon feed line 10, and carries a small stream composed essentially of hydrogen, methane, nitrogen and acetylene. Liquid from stripper 43 is passed via line 47 and flashed into the top of a second stripper 48 operated at atmospheric pressure. Liquid from stripper 48 passes via line 49 into the vacuum stripper 50 operated at a pressure of 50 mm. Hg absolute. The solvent water is withdrawn from the bottom of stripper 50 by pump 51 and line 52, and is ordinarily returned in large part to line 40 for reuse, part being discarded to avoid build-up of impurities. Acetylene desorbed in unit 50 is compressed by a compressor or vacuum pump 53 and passed via line 54 to junction with line 55 which carries acetylene recovered in the atmospheric pressure stripper 48. The combined product stream comprises acetylene in a purity of at least 90 per cent, and if required can be subjected to further known treatments to increase the purity if required for special chemical uses.

Returning now to the gas which was freed from acetylene in absorber 39, it passes through line 56 and compressor 57 to an ethylene absorber 58, operated at 500 p. s. i. a. This unit is fed at the top with mineral seal oil, for example a narrow boiling largely paraffinic naphtha fraction having a molecular weight of about 250, from line 59. The rich oil flows from the bottom of absorber 58 via line 60 to the top of stripper 61. Lean oil flows from the bottom of stripper 61 through line 59 for reuse in absorber 58. The ethylene-rich gas is recovered through line 62 and has an ethylene purity of about 60 per cent, the balance of the gas being principally ethane and $C_3$ hydrocarbons. This gas stream, if required for particular use, can be additionally purified by means well within the skill of the art. If maximum acetylene production is required, it can be returned to the process for pyrolysis in the arc. Residue gas, rich in hydrogen and nitrogen, is withdrawn from the top of ethylene absorber 58 and passed through lines 63 and 18 to the pebble heater for use as fuel gas. Part or all can be recovered through line 64 for recovery and use of the hydrogen and/or nitrogen content if desired.

Suitable construction, and process conditions to be used, for the arc furnace 24 have been described in the art and accordingly details thereof will not be repeated here. One such description, to which reference is hereby made is given in the article by Pettyjohn, National Petroleum News, vol. 38, pages R–596 to R–604, August 7, 1946. Said article describes production of acetylene from natural gas by the arc process, but the same construction and current supply of the arc, and the same general operating conditions, are applicable in practicing the present invention. British Patent 294,494 (1927) describes a method of producing HCN and acetylene by reaction of nitrogen with methane in an electric arc, which method can be improved by the practice of my invention.

While the ratio of nitrogen to hydrocarbon in the feed gas of my invention can be varied within wide limits with resulting variation in the yield of HCN and acetylene and ratio of HCN to acetylene produced, I prefer that the mol ratio of nitrogen to methane be at least 1:1. With say 10 per cent $N_2$ in the feed gas, the remainder being natural gas, a yield of about 3 to 4 per cent HCN is obtained. On the other hand, this yield is much increased, even up to 15 per cent, by increasing the nitrogen content of the feed gas to 50 per cent, and at the same time a higher conversion of nitrogen per pass is obtained.

Suitable construction, composition of pebbles, and methods of operating, for the pebble heating unit 13—17, are known to the art. It is important that the residence time of the feed gas in unit 13 be short; it is desirably in the range of 0.1 to 0.5 second, and preferably not over 0.2 second. The gas as it leaves is preferably at 2000° F., though any temperature within the range of 1500° F. to 2000° F. or even somewhat higher is useful. These temperatures refer especially to a methane-rich feed, and must be lowered for heavier feeds such as liquefied petroleum gases or naphthas; proper temperatures for such feed stocks can be chosen by those skilled in the art to avoid excessive cracking. The transfer line 23 between pebble heater 13 and arc furnace 24 should be as short as practicable in order to avoid loss of preheat and minimize side reactions.

The pebble heater unit is constructed of a metal shell and conduits lined with suitable refractories resistant to high temperatures and abrasion. The pebbles themselves must be especially resistant to thermal and mechanical shock. Suitable pebble heater type apparatus includes two refractory-lined contacting chambers disposed one above the other and connected by a refractory-lined passageway or pebble throat of relatively narrow cross section. Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle. The term "pebble" as used throughout this specification denotes any refractory material in flowable form and size which can be utilized to carry heat from one zone to another. Pebbles are conventionally substantially spherical and are about $\frac{1}{8}''$ to about $1''$ in diameter with the preferred size for high temperature processes about $\frac{3}{8}''$. Pebbles must be of refractory materials which will withstand temperatures at least as high as the highest temperature attained in the pebble heating zone. They may be of ceramic or other refractory materials, and must be of sufficiently hight density to permit high gas flow rate without entrainment of pebbles. Pebbles composed of alumina, beryllia, "carborundum," mullite, periclase, and zirconia when properly fired serve very well at the high temperatures employed in processes and apparatus of the type herein disclosed.

Figure 2 illustrates another embodiment of my invention. In this figure, three pebble chambers, designated from bottom to top as 101, 102, and 103, are employed, interconnected by pebble throats 104 and 105 as indicated. Cool pebbles are transported from bottom to top through flow control and elevator means indicated diagrammatically by line 107.

Pebbles are heated in the middle chamber 102, which corresponds to chamber 17 in Figure 1, by heating gases supplied through line 108 which is to be taken as a diagrammatic representation of hot combustion gas and/or fuel and/or air supply. The hot pebbles flow down through throat 104 into the feed-heating chamber 101 wherein feed hydrocarbons introduced through line 109, together with nitrogen introduced through line 99, are rapidly brought to the desired temperature, e. g. 2000° F., and simultaneously partially cracked as discussed hereinabove with respect to Figure 1. Some carbon is deposited by the carbon-formers and carried by the pebble stream through 107 into the top chamber 103 and thence downwardly into chamber 102 where the carbon is burned and supplies heat. The term "carbon" as used herein refers to elemental carbon and also very heavy carbonaceous oils and solid residues having a high carbon content yet still classifiable as hydrocarbon material.

The preheated feed flows through line 110 to the arc furnace 111 for formation of acetylene, HCN, and ethylene therein. The furnace 111 is operated so as to give maximum acetylene and HCN production irrespective of carbon black quality and quantity. In this country there are more efficient ways of making carbon black of excellent characteristics than by the electric arc method, and in accordance with this embodiment of my invention, instead of balancing black quality and quantity with quantity of acetylene and HCN produced, these latter are made as great as possible and the carbon black is not recovered as such. This permits the best utilization of electrical energy to produce the high priced and difficult-to-make acetylene and HCN. Effluent of arc furnace 111 is immediately subjected to partial quench (to 1000–1500° F.) by a water fog from line 112 introduced into effluent transfer line 113. The latter enters the bottom of top pebble chamber 103 wherein the cool pebbles further quench the HCN- and acetylene-containing gases, recover heat therefrom and remove the great bulk of the carbon present in those gases by entrainment of the carbon in the pebbles, the pebble bed acting somewhat as a filter. The thus-treated gases exit from unit 103 through line 114 at a temperature below 1000° F. and preferably below 500° F. and are passed to further treatment and recovery steps. The pebbles and accompanying carbon derived both from feed and effluent of the arc, flow down through throat 105 into middle chamber 102 wherein the carbon is burned and supplies heat to the pebbles for use in bottom chamber 101.

As an indication of the quantity of carbon produced when various light hydrocarbons are passed through the arc under conditions yielding acetylene, methane may often give about 5 weight per cent carbon. On the other hand, 3-carbon-atom hydrocarbons (propane and propylene) when cracked at 1500° F. for ethylene production yields in the neighborhood of 7 to 8 per cent carbon and heavy oils. If cracked with sufficient severity to produce appreciable yields of acetylene, from 10 to 15 per cent carbon and heavy oil results. More than half of this material is retained in the pebble bed moving down through the feed preheater. Thus the advantages of my invention in minimizing the quantity of carbonaceous matter carried into and formed in the arc become apparent.

While the invention has been described in certain preferred embodiments, it will be appreciated that variations beyond the exact details set forth herein, are possible without departing from the invention in its broadest aspects.

I claim:

1. A process for the production of hydrogen cyanide and acetylene which comprises heating refractory ceramic pebbles in the form of a continuously downwardly moving compact bed in a pebble heating zone by contact of same with upwardly flowing hot combustion gases, continuously passing resulting heated pebbles at a temperature in the range of 2200° F. to 2500° F. by gravity into a lower feed heating zone and passing same therethrough in the form of a continuously downwardly moving compact bed, continuously introducing into a low point of said feed heating zone a feed comprising nitrogen and natural gas and flowing same rapidly upward through said feed heating zone in contact with said downwardly moving bed of hot pebbles for a period of from 0.1 to 0.5 second thereby cooling the pebbles and heating the feed to a temperature in the range of 1500 to 2000° F., so as to crack a portion of the hydrocarbon and deposit carbon on the pebbles in said feed heating zone, continuously withdrawing resulting heated feed and partially cracked hydrocarbon and hydrogen from a high point in said feed heating zone and immediately passing same through an electric arc continuously at conditions including a temperature of at least 2800° F. effecting cracking of said feed and formation of hydrogen cyanide and acetylene, immediately quenching the effluent from the electric arc to a temperature below 1500° F. so as to preserve hydrogen cyanide and acetylene, separately recovering hydrogen cyanide and acetylene from the quenched effluent, and continuously withdrawing cooled pebbles from the bottom of said feed heating zone, elevating same, and introducing same into the top of said pebble heating zone as a continuous supply of pebbles to the top of said continuously downwardly moving compact bed of pebbles being heated therein.

2. A process for the production of hydrogen cyanide and acetylene which comprises heating refractory ceramic pebbles in the form of a continuously downwardly moving compact bed in a pebble heating zone by contact of same with upwardly flowing hot combustion gases, continuously passing resulting heated pebbles at a temperature of 2200° F. to 2500° F. by gravity into a lower feed heating zone and passing same therethrough in the form of a continuously downwardly moving compact bed, continuously introducing into a low point of said feed heating zone a feed comprising nitrogen and natural gas and flowing same rapidly upward through said feed heating zone in contact with said downwardly moving bed of hot pebbles for a period of from 0.1 to 0.5 second thereby cooling the pebbles and heating the feed to a temperature in the range of 1500 to 2000° F. while concomitantly cracking $C_2$ and heavier hydrocarbons in said feed forming hydrogen and carbon, the latter being largely retained in the pebble bed, continuously withdrawing resulting heated feed from a high point in said feed heating zone and immediately passing same through an electric arc continuously at conditions including a temperature of at least 2800° F. effecting cracking of said feed and formation of hydrogen cyanide and acetylene, immediately quenching the effluent from the electric arc to a temperature below 1500° F. so as to preserve hydrogen cyanide and acetylene, separately recovering hydrogen cyanide and acetylene from the quenched effluent, continuously withdrawing cooled pebbles and carbon from the bottom of said feed heating zone, elevating same, and introducing same into the top of said pebble heating zone as a continuous supply of pebbles to the top of said continuously downwardly moving compact bed of pebbles being heated therein, supplying oxygen-containing gas to said pebble heating zone sufficient to oxidize said carbon thereby supplying heat to said pebble heating zone.

3. A process for the production of hydrogen cyanide and acetylene which comprises heating refractory ceramic pebbles in the form of a continuously downwardly moving compact bed in a pebble heating zone by contact of same with upwardly flowing hot combustion gases formed as hereinafter described, continuously passing resulting heated pebbles at a temperature of 2200° F. to 2500° F. by gravity into a lower feed heating zone and passing same therethrough in the form of a continuously downwardly moving compact bed, continuously introducing into a low point of said feed heating zone a feed comprising nitrogen derived as hereinafter described and natural gas and flowing same rapidly upward through said feed heating zone in contact with said downwardly moving bed of hot pebbles for a period of from 0.1 to 0.5 second thereby cooling the pebbles and heating the feed to a temperature in the range of 1500 to 2000° F. while concomitantly cracking $C_2$ and heavier hydrocarbons in said feed forming hydrogen and carbon, the latter being largely retained in the pebble bed, continuously withdrawing resulting heated feed from a high point in said feed heating zone and immediately passing same through an electric arc continuously at conditions including a temperature of at least 2800° F. effecting cracking of said feed and formation of hydrogen cyanide and acetylene, immediately quenching the effluent from the electric arc to a temperature below 1500° F. so as to preserve hydrogen cyanide and acetylene, separately recovering hydrogen cyanide and acetylene from the quenched effluent, continuously withdrawing cooled pebbles and carbon from the bottom of said feed heating zone, elevating same, and introducing same into the top of said pebble heating zone as a continuous supply of pebbles to the top of said continuously downwardly moving compact bed of pebbles being heated therein, supplying air to said pebble heating zone sufficient to oxidize said carbon thereby supplying heat to said pebble heating zone and removing oxygen from the nitrogen of said air and forming said hot combustion gases, recovering said combustion gases and removing carbon dioxide therefrom forming a nitrogen-rich gas, and employing the latter as part of said feed.

4. In the formation of hydrogen cyanide and acetylene by pyrolysis in an electric arc of a feed comprising nitrogen and hydrocarbon material containing components more prone to carbon formation in the arc than the principal component in the hydrocarbon material, the improvement which comprises subjecting said feed immediately prior to passage through the arc to rapid flow upwardly through a downwardly moving compact bed of preheated pebbles for a period of time sufficient to crack a major portion of said components which are more prone to carbon formation to carbon and hydrogen but insufficient to more than incidentally crack said principal component and concomitantly preheating said feed and retaining said carbon in said down-flowing bed of pebbles immediately thereafter passing the resulting preheated and partially cracked feed to an electric arc so as to form hydrogen cyanide and acetylene, immediately quenching the effluent from the electric arc to a temperature below about 1500° F., and separately recovering the hydrogen cyanide and acetylene.

5. A process for the production of hydrogen cyanide and acetylene in maximum yields by pyrolysis of a feed comprising nitrogen and a hydrocarbon stock in the electric arc which comprises continuously and cyclicly passing refractory heat-resistant pebbles downwardly by gravity as a compact mass or bed through three superimposed zones designated from top to bottom as quenching, pebble heating and feed heating zones interconnected by pebble throat zones of narrowed cross section and removing pebbles from the bottom of said feed heating zone, elevating same, and supplying same to the top of said quenching zone, introducing an oxygen-containing gas into said pebble heating zone and maintaining said zone at carbon-burning conditions including a temperature sufficiently high that pebbles passing downwardly therefrom into said feed heating zone are at a temperature within the range of 2200 to 2500° F., passing said feed rapidly upwardly through the pebbles in said feed heating zone for a time in the range of 0.1 to 0.5 second sufficient to preheat said feed to at least 2000° F. and convert to carbon more unstable components of said feed but insufficient to produce more than a minor portion of the total acetylene produced while concomitantly retaining at least most of said carbon in said pebbles, immediately passing thus heated feed through an electric arc maintained at conditions effecting maximum hydrogen cyanide and acetylene production irrespective of quality of carbon concomitantly produced, immediately partially quenching the resulting stream of products by a fog of water to a temperature at least as low as 1500° F., immediately passing the quenched material into a low point of the aforesaid quenching zone and flowing same upwardly therethrough countercurrent to the downward flowing bed of pebbles entering the top of said zone in a relatively cool condition resulting from contact with fresh feed in said feed heating zone thereby further quenching HCN- and acetylene-containing products of the arc conversion to a temperature at least as low as 1000° F. and concomitantly entraining at least most of the carbon in said products in the downwardly moving bed of pebbles along with carbon entrained in said feed heating zone as aforesaid, withdrawing gases from a high point of said quenching zone and separately recovering HCN and acetylene therefrom, and supplying sufficient heat to said pebble heating zone by combustion of fuel including carbon carried into said zone by said pebbles to provide the heat required for said feed preheating and cracking in said feed heating zone.

6. A process according to claim 5 in which said hydrocarbon feed is natural gas.

References Cited in the file of this patent

UNITED STATES PATENTS

| Number | Name | Date |
| --- | --- | --- |
| 1,562,684 | Brown | Nov. 4, 1925 |
| 1,982,407 | Wheeler | Nov. 27, 1934 |
| 2,160,170 | Martin et al. | May 30, 1939 |
| 2,432,872 | Ferro | Dec. 16, 1947 |
| 2,478,875 | Merrill et al. | Aug. 9, 1949 |
| 2,486,627 | Arnold | Nov. 1, 1949 |
| 2,530,274 | Weber | Nov. 14, 1950 |
| 2,549,240 | Robinson | Apr. 17, 1951 |
| 2,608,594 | Robinson | Aug. 26, 1952 |

FOREIGN PATENTS

| Number | Country | Date |
| --- | --- | --- |
| 294,494 | Great Britain | of 1927 |
| 363,375 | Great Britain | Dec. 7, 1931 |
| 353,407 | Great Britain | July 21, 1931 |